UNITED STATES PATENT OFFICE.

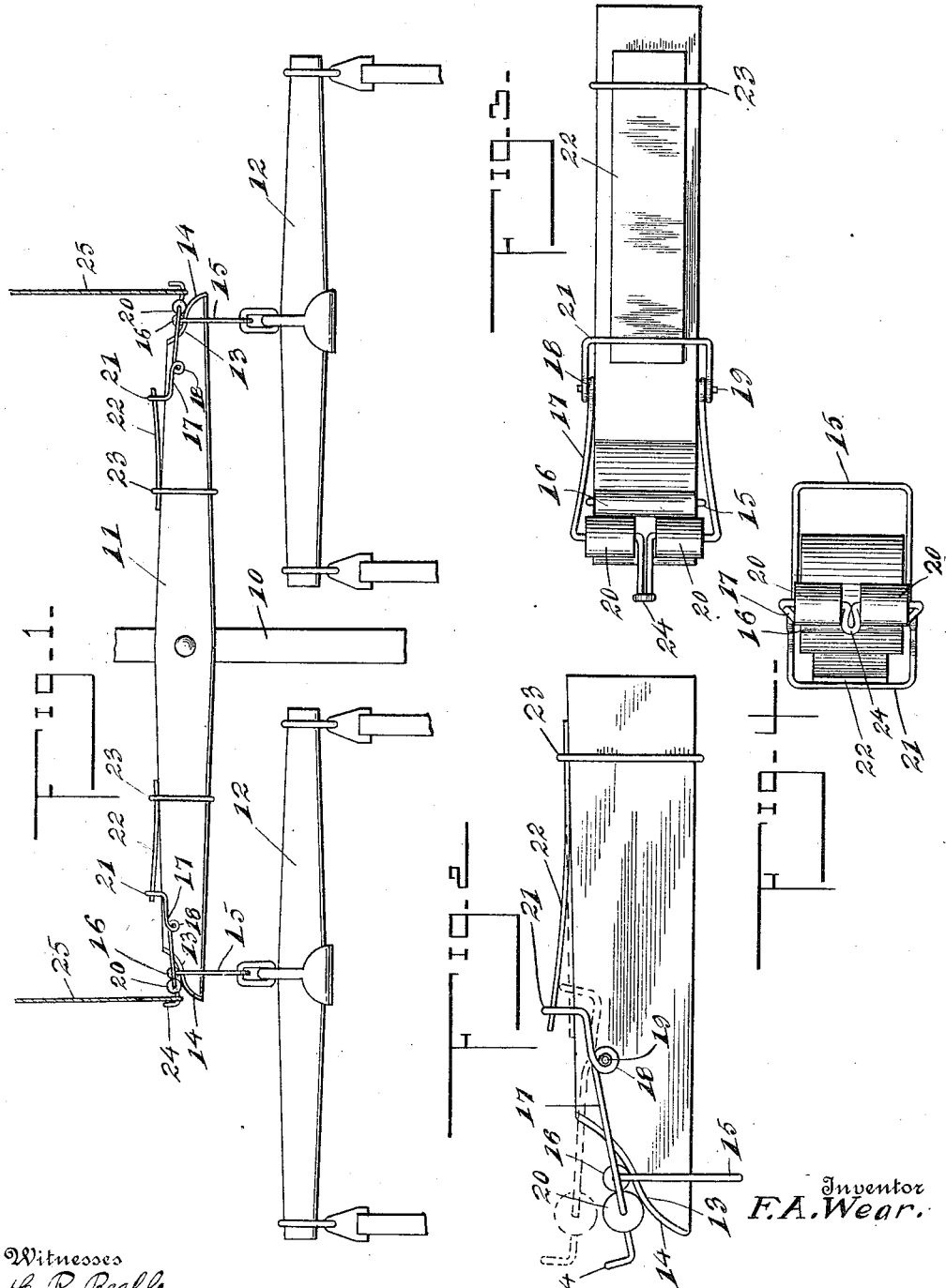

FRANCIS A. WEAR, OF SALLISAW, OKLAHOMA.

HORSE-RELEASER.

1,050,882.   Specification of Letters Patent.   Patented Jan. 21, 1913.

Application filed October 17, 1912. Serial No. 726,324.

*To all whom it may concern:*

Be it known that I, FRANCIS A. WEAR, a citizen of the United States, residing at Sallisaw, in the county of Sequoyah, State of Oklahoma, have invented certain new and useful Improvements in Horse-Releasers; and I do hereby declare the following to be a full, clear, and exact description of the invention, such as will enable others skilled in the art to which it appertains to make and use the same.

This invention relates to horse releasers and has for an object to provide an extremely simple and durable horse releaser which will be composed of a few number of parts that will not readily get out of order.

With the above object in view the invention consists of certain novel details of construction and combination of parts hereinafter fully described and claimed, it being understood that various modifications may be made in the minor details of construction within the scope of the appended claims.

In the accompanying drawing forming part of this specification:—Figure 1 is a plan view of a double-tree equipped with my invention. Fig. 2 is an enlarged plan view of one end of a double-tree equipped with my invention. Fig. 3 is a rear elevation of the parts shown in Fig. 2. Fig. 4 is an end elevation of the parts shown in Fig. 3.

Referring now to the drawing in which like characters of reference designate similar parts, 10 designates a vehicle pole, 11 a double-tree, and 12 swingle trees attached to the ends of the double-tree by my invention.

In a practical embodiment of my invention, each end face of the double-tree is beveled as shown at 13 and a wear plate 14 is secured thereto, each wear plate sloping outwardly from the rear face toward the front face of the double-tree. Each swingle tree is equipped centrally with a rearwardly extending eye 15 which is adapted to receive the related end of the double-tree, this eye being equipped with a roller 16 adapted to bear upon the corresponding wear plate.

For locking each swingle tree eye 15 to the related end of the double tree, each end of the double tree is equipped with a substantially rectangular stiff wire loop 17, the loop being mounted longitudinally upon the double tree with the rear corner of the double tree projecting through the loop. The longitudinal sides of the loop are provided with hinge eyes 18 which bear upon the top and bottom faces of the double tree and receive pivot pins 19 carried by said faces. A pair of rollers 20 are mounted on the outer end of the loop and normally bear upon the related wear plate in advance of and contact intimately with the related swingle tree eye roller 16. The inner end of the loop is offset rearwardly as shown at 21 and is spaced from and straddles the rear face of the double tree. A leaf spring 22 is secured at one end to the rear face of the double tree by a clamp 23, the free end of the spring being interposed between the swingle tree and offset end of the loop and serving to hold the loop so rocked on the pivot pins that the rollers 20 are held in tight engagement with the related wear plate. The pull of the swingle trees down the sloping wear plates serve to tightly wedge the swingle tree eye rollers between the wear plates and rollers of the loops and positively prevent accidental escape of the swingle tree. Each loop is provided between its rollers 20 with an eye 24 through which a pull cord 25 is engaged. Upon the pull cords being pulled rearwardly, the outer ends of both of the loops 17 will be rocked rearwardly and the rollers thereof disengaged from the swingle tree eye rollers whereupon the latter are freed to immediately escape from the ends of the double tree and simultaneously release both swingle trees.

What is claimed, is:—

1. The combination with a double tree having an outwardly beveled end face, of a swingle tree securing eye encircling the end of said double tree, a roller on said eye bearing upon said beveled face, a rocking spring controlled member extending longitudinally of said double tree, a roller on said member bearing upon said beveled face in advance of and contacting intimately with the first named roller, the first named roller being tightly wedged between said beveled face and the last named roller, and means for rocking said member to release said rollers from engagement and free said eye from said double tree.

2. The combination with a double-tree having an outwardly beveled end face, of a swingle tree securing eye encircling the end of said double-tree and having a roller bearing upon said beveled face, a spring controlled loop pivotally mounted upon and extending longitudinally of said swingletree, the rear corner of said double-tree being passed through said loop, said loop having a roller bearing upon said beveled face in advance of the first named roller and normally holding said eye against escape, and means for rocking said loop against the tension of its spring to disengage both of the above named rollers and free said eye.

In testimony whereof, I affix my signature, in the presence of two witnesses.

FRANCIS A. WEAR.

Witnesses:
J. R. REEDER,
JOE HOSMAR.

Copies of this patent may be obtained for five cents each, by addressing the "Commissioner of Patents, Washington, D. C."